Sept. 24, 1929.  G. P. ADAMSON  1,729,431
METHOD OF MAKING HYDROCHLORIC ACID
Filed Dec. 20, 1927
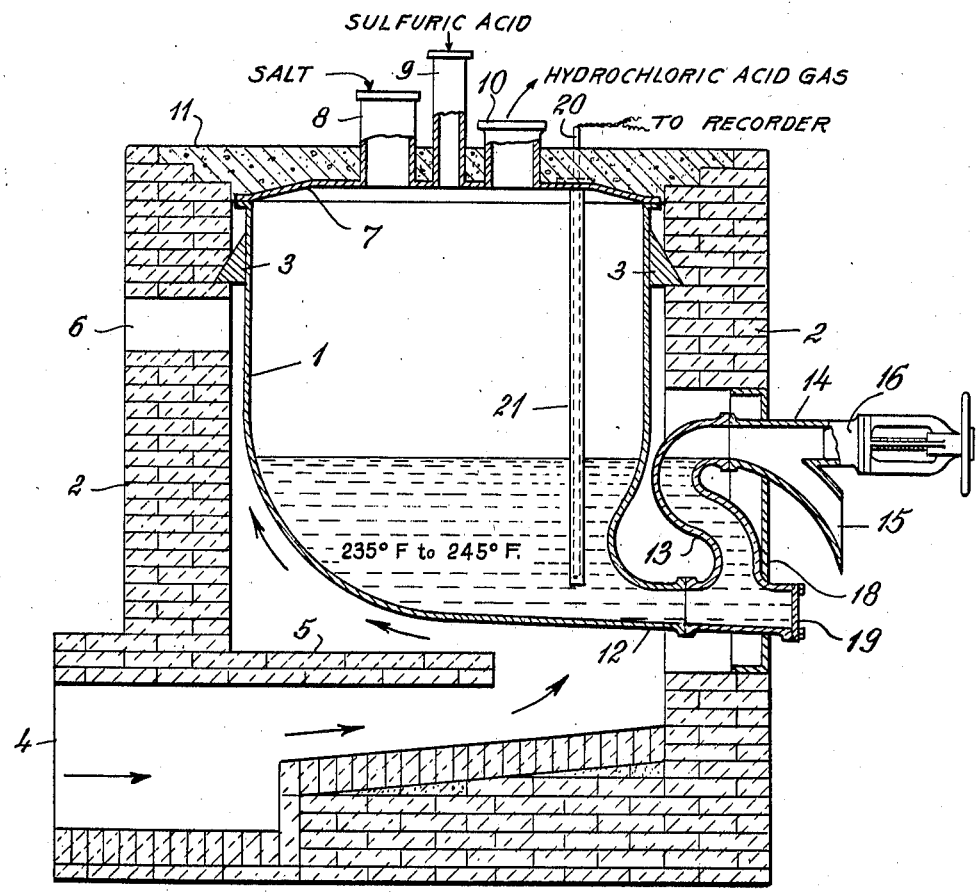
INVENTOR
George P. Adamson
BY Forbes Silsby
ATTORNEY Patented Sept. 24, 1929

1,729,431

UNITED STATES PATENT OFFICE

GEORGE P. ADAMSON, OF SEARSPORT, MAINE, ASSIGNOR TO GENERAL CHEMICAL COMPANY, OF NEW YORK, N. Y., A CORPORATION OF NEW YORK

METHOD OF MAKING HYDROCHLORIC ACID

Application filed December 20, 1927. Serial No. 241,290.

My invention relates to the manufacture of hydrochloric acid, and more particularly to a method of producing hydrochloric acid of a high degree of purity.

One method of manufacturing commercial hydrochloric acid and nitre cake (sodium bisulfate) is by reacting common salt and sulfuric acid in a retort or similar construction at a relatively high temperature; hydrochloric acid being evolved as a gas and subsequently condensed in absorbers.. The basic reaction is best indicated by the equation:

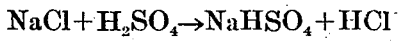
$$NaCl + H_2SO_4 \rightarrow NaHSO_4 + HCl$$

The hydrochloric acid obtained thereby is satisfactory for various industrial applications but is not of the standard of purity essential for many uses.

The manufacture of hydrochloric acid from the materials noted obviously presents many possibilities for contamination of the product acid. In addition to contamination by the associated reaction materials, e. g. the sulfuric acid, the active nature of the materials involved and the temperature factor are such as to cause corrosion of the apparatus with a resultant contamination of the hydrochloric acid by these corrosion products.

Some of the common impurities contained in commercial hydrochloric acid are sulfuric acid, chlorine, iron chloride, arsenic chloride, sulfur dioxide and organic matter. Cast iron is the material ordinarily used in the construction of the pots, retorts, and similar containers in which the action is carried out, and this material apparently furnishes the arsenic which appears in the commercial acid. The factors which influence the contamination of the hydrochloric acid are so numerous and of such a nature as to render an all-inclusive solution extremely difficult from a practical standpoint, and while numerous attempts have been made to produce pure hydrochloric acid directly without redistillation from the materials noted none have heretofore met with much success. Either the acid obtained is not of a sufficiently high degree of purity, or the expense and difficulty involved in securing the desired purity are such as to render industrial application impractical.

The object of my invention is to provide a commercially practical method of producing hydrochloric acid of a high degree of purity.

A further object of my invention is to provide a method of the order noted, which is readily adaptable to the present industrial methods and apparatus for producing commercial hydrochloric acid and nitre cake.

I have found that by a very careful regulation of certain factors influencing the reaction between salt and sulfuric acid, and essentially the temperature, that hydrochloric acid of a surprising degree of purity may be obtained.

In the accompanying drawing, I have shown a sectional view of a furnace construction and retort which may be used for carrying out the method of my invention.

The retort, which is a large bowl usually made of cast iron, is indicated generally by the reference character 1. Retort 1 is retained in the brick setting 2 by any suitable means such as lugs 3 fastened to or made integral with the retort.

A fire box or combustion space 4 is provided in which coal or oil is burned to furnish heat for the reaction in the retort. The hot gases are directed around the retort by means such as a baffle wall 5 and are passed to a stack through an opening 6 in the setting.

A member 7, which acts as a closure for the retort, is provided with three pipe sections 8, 9, and 10, respectively. These pipe sections, which are usually made integral with the member 7, provide the openings through which the salt and sulfuric acid are supplied to the retort, and the opening through which the hydrochloric acid gas is drawn off. Salt is supplied through the pipe 8, sulfuric acid is supplied through the pipe 9, and the hydrochloric acid gas is drawn off through the pipe 10. The member 7 is covered by heat insulating material 11 such as sand or ashes through which the pipes 8, 9, and 10 extend.

The bottom of the retort, of general semi-spherical shape, is formed into a tangential extension 12. A goose neck member 13 is fastened to the end of extension 12 to extend upwardly therefrom. The member 13 is preferably made in the form of a goose neck so that it can be applied easily to existing types of retorts and so that it will fit in close proximity to the retort and thus be kept at the retort temperature. The member 13 can be opened at the bottom by opening a gate, valve, or plate indicated by the numeral 19 in the drawing to drain the retort and the goose neck member. A discharge member 14, provided with a discharge spout 15, is fastened to the upper end of the goose neck member. The extension 12, goose neck member 13, and discharge member 14, form the discharge outlet for the sodium bisulfate. The discharge outlet may be closed by means of valve 16. A plate 18 acts as a closure for the opening in the brick setting through which the discharge outlet extends.

This particular construction is described in detail in the application of C. S. Benjamin, Serial No. 195,606 filed June 1, 1927.

The primary materials, i. e. the salt (NaCl) and sulfuric acid ($H_2SO_4$ in water solution) are substantially continuously introduced into the heated retort through their respective inlets 8 and 9 in any suitable manner, and together with the products of the reaction form a thick soup or molten mixture. The hydrochloric acid gas passes off through its outlet 10, and the residual material in the retort is drawn off through the goose neck member 13 or at the gate 19, either continuously or at intervals as desired. Preferably withdrawal is accomplished through the goose neck because in this manner a substantial depth of the reaction materials is always maintained in the retort, thus aiding in the uniform maintenance of the temperature conditions specified hereinafter.

The reaction between the salt and acid fed in appears to be confined to the surface or upper layers of the body of materials within the retort proper, a layer of the reacting materials being thereby formed which floats or rests upon the heavier bisulfate liquor collected in the lower part of the retort. There is thus no appreciable escape of hydrochloric acid gas through the goose-neck member 13.

An illustrative procedure for carrying out the method of my invention is as follows:

4,250 lbs. of oil of vitriol (66° Bé. $H_2SO_4$) are diluted with water to 60° Bé. acid (measured at 60° F.). The acid is blown vigorously with air during dilution and light blowing is continued for a suitable period thereafter to reduce the $SO_2$ content to the point of practical elimination. The 60° Bé. acid free from $SO_2$ may obviously be provided originally rather than by dilution of the stronger oil of vitriol.

For reaction with this acid 2,500 lbs. of common salt are provided and the two are introduced simultaneously, substantially continuously, and at proportionate rates, into the retort throughout the operation. The acid may be preheated or otherwise treated as will be apparent to one skilled in the art. The proportions of acid and salt noted are roughly in accordance with the amounts indicated by the basic equation hereinbefore referred to, and will produce a soup containing bisulfate and which has an acidity of approximately 35% (i. e. 35% $H_2SO_4$ by weight of the soup). I have found this particular acidity to be especially desirable, although the proportions of reacting materials may be varied somewhat from the exact amounts noted and hence produce a somewhat greater or less acidity in the soup. The amount of liquid material, and particularly the water content, is such as to produce a soup which will flow readily at the temperature employed. The temperature of this soup is maintained within the range 235° to 245° F, (i. e. not below 235° nor above 245°) and preferably at about 240° F. Only a light firing is required for this purpose. Preferably the temperature is measured by means of a recording pyrometer or thermometer 20 which extends downwardly through an opening in the retort cover 7 to within a short distance of the bottom of the retort. The pyrometer will be protected against corrosion by a metal casing 21 as is customary.

When the above conditions are observed, hydrochloric acid gas of a very high degree of purity will come off through the outlet 10, whereupon it may be absorbed in water or otherwise collected, and treated in the usual and well-known manner, due care being exercised that no contamination will result from impure absorption materials or other sources in the treatment of the acid after leaving the retort. The residual soup in the retort is of such consistency due to its content of liquid materials as to be readily removed. This bisulfate-containing residue may be utilized in any desired manner.

The temperature control of the soup is an element of vital importance in preparing pure hydrochloric acid gas by my method, and if the temperature limitations indicated are appreciably over-stepped, very undesirable effects will result.

For example, if the temperature of the soup rises appreciably above 245° F., sulfuric acid will distill over with the hydrochloric acid gas, organic matter in the salt will be charred resulting in the evolution of $SO_2$, and foaming difficulties will be encountered.

If the temperature falls appreciably below 235° F., even more serious troubles will be encountered. Undecomposed salt will accumulate and when the heat is raised to normal, the sudden reaction will cause a boil-over. Moreover, the corrosive action on the iron will be tremendously increased, and as the cast iron contains arsenic, the latter will be evolved as $AsCl_3$, and the product acid spoiled.

The reasonably careful observance of the temperature control characterizing my method, however, results in the avoidance of these difficulties, and with the exercise of due care in the manner and means of absorption or other treatment of the hydrochloric acid gas distilled, so that no contamination may occur in these operations, the hydrochloric acid obtained will satisfy exacting requirements as regards purity.

The particular acidity of the soup noted and the content of liquid material in the soup are of advantage in carrying out my method in the temperature range noted. The production and distillation of pure hydrochloric acid gas proceeds rapidly and efficiently under such conditions, and the content of liquid materials is sufficient to prevent freezing or solidification. The particular retort and furnace construction which I have described in relation to the carrying out of my method facilitates efficient temperature control and residue removal. The use of this construction, however, is intended merely to be illustrative for it is obvious that various other constructions can also be used in carrying out the method of my invention.

I claim as my invention:

1. The method of making substantially pure hydrochloric acid gas which comprises reacting sulfuric acid and salt at a temperature within the range 235° to 245° F.

2. The method of making substantially pure hydrochloric acid gas which comprises reacting sulfuric acid and salt in proportions to form a soup of such consistency as to flow readily, and maintaining the temperature in said soup within the range 235° to 245° F.

3. The method of making substantially pure hydrohloric acid gas which comprises reacting sulfuric acid and salt while maintaining the reacting materials at a temperature of substantially 240° F.

4. The method of making substantially pure hydrochloric acid gas which comprises preparing from sulfuric acid and salt a soup of such consistency as to flow readily at a temperature within the range 235° and 245° F., and maintaining the temperature of said soup within said range while hydrochloric acid gas is being evolved.

5. The method of making substantially pure hydrochloric acid gas which comprises contacting sulfuric acid and salt in such proportions as to yield a soup which will have an acidity of approximately 35%, and maintaining the temperature of said soup within the range 235° to 245° F.

6. The method of making substantially pure hydrochloric acid gas which consists in contacting sulfuric acid and salt in such proportions as to provide an acidity of substantially 35% in the soup thereby obtained, and as to result in such consistency of the soup that the same will flow readily at a temperature within the range 235° to 245° F., and maintaining the temperature of said soup within said temperature limits while hydrochloric acid gas is being evolved.

7. The method of making substantially pure hydrochloric acid gas which comprises continuously contacting sulfuric acid and salt in proportions to form a soup which will flow readily at a temperature within the range 235° to 245° F., and maintaining the temperature of said soup within said temperature limits while hydrochloric acid gas is being evolved.

8. The method of making substantially pure hydrochloric acid gas which comprises continuously contacting sulfuric acid and salt in proportions to yield a soup which will have an acidity of approximately 35% and which will flow readily at a temperature within the range 235° to 245° F., and maintaining the temperature of said soup within said temperature limits while hydrochloric acid gas is being evolved.

9. The method of making substantially pure hydrochloric acid gas which comprises contacting substantially 60° Bé. sulfuric acid and salt in proportions to form a soup which will flow readily at a temperature within the range 235° to 245° F., and maintaining the temperature of said soup within said temperature limits while hydrochloric acid gas is being evolved.

10. The method of making substantially pure hydrochloric acid gas which comprises continuously contacting substantially 60° Bé. sulfuric acid and salt in proportions to yield a soup of approximately 35% acidity and which will flow readily at a temperature within the range 235° to 245° F., and maintaining the temperature of said soup within said temperature limits while hydrochloric acid gas is being evolved.

11. The method of making substantially pure hydrochloric acid gas which comprises reacting substantially $SO_2$ free sulfuric acid and salt in proportions to form a soup which will flow readily, and maintaining the temperature in said soup within the range 235° to 245° F.

12. The method of making substantially pure hydrochloric acid gas which comprises diluting oil of vitriol with water to form 60° Bé. acid, blowing the acid with air during the dilution to thereby form substantially $SO_2$ free acid, contacting the acid thus produced with salt in proportions to yield a soup of approximately 35% acidity and which will flow readily at a temperature within the range 235° to 245° F., and maintaining the temperature of said soup within said temperature limits while hydrochloric acid gas is being evolved.

In testimony whereof, I affix my signature.

GEO. P. ADAMSON.